US012438412B2

(12) United States Patent
Yazaki (10) Patent No.: US 12,438,412 B2
(45) Date of Patent: Oct. 7, 2025

(54) ROTATING ELECTRIC MACHINE (71) Applicant: HONDA MOTOR CO., LTD., Tokyo (JP)

(72) Inventor: Manabu Yazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 226 days.

(21) Appl. No.: 18/473,371

(22) Filed: Sep. 25, 2023

(65) Prior Publication Data

US 2024/0113588 A1 Apr. 4, 2024

(30) Foreign Application Priority Data

Sep. 29, 2022 (JP) ................................. 2022-156430

(51) Int. Cl.
*H02K 5/18* (2006.01)
*B64D 27/24* (2024.01)
*H02K 1/32* (2006.01)
*H02K 5/16* (2006.01)
*H02K 5/20* (2006.01)
*B64D 27/30* (2024.01)

(52) U.S. Cl.
CPC ................. *H02K 5/18* (2013.01); *H02K 1/32* (2013.01); *H02K 5/161* (2013.01); *H02K 5/207* (2021.01); *B64D 27/30* (2024.01)

(58) Field of Classification Search
CPC ........ B64D 27/24; B64D 27/30; B64D 33/08; H02K 1/32; H02K 5/161; H02K 5/18; H02K 5/207
USPC ........................................................... 310/61
See application file for complete search history.

(56) References Cited

U.S. PATENT DOCUMENTS

| | | | | |
|---|---|---|---|---|
| 8,928,195 B2* | 1/2015 | Ohashi | ..................... | H02K 9/19 |
| | | | | 310/58 |
| 9,030,062 B2* | 5/2015 | Matsumoto | .............. | H02K 1/32 |
| | | | | 310/58 |
| 9,300,189 B2* | 3/2016 | Hautz | ....................... | H02K 9/10 |
| 9,479,028 B2* | 10/2016 | Akiyoshi | ............... | H02K 11/05 |
| 9,806,572 B2* | 10/2017 | Yamagishi | ............... | H02K 9/19 |
| 9,847,682 B2* | 12/2017 | Takahashi | ............... | H02K 1/28 |
| 10,707,726 B2* | 7/2020 | Manabe | ................... | H02K 1/32 |
| 10,778,053 B2* | 9/2020 | Ito | .......................... | H02K 7/085 |
| 11,018,539 B2* | 5/2021 | Fröhlich | ................. | H02K 1/32 |
| 11,056,941 B2* | 7/2021 | Matsumoto | ............ | H02K 1/276 |
| 11,205,931 B2* | 12/2021 | Fröhlich | ................ | H02K 7/003 |
| 11,205,939 B2* | 12/2021 | Yamaguchi | .............. | H02K 9/19 |

(Continued)

FOREIGN PATENT DOCUMENTS

| | | | | | |
|---|---|---|---|---|---|
| CN | 103843231 B | * | 2/2017 | ............. | H02K 9/227 |
| DE | 102016210930 B4 | * | 10/2021 | ............... | H02K 1/32 |

(Continued)

*Primary Examiner* — Alex W Mok
(74) *Attorney, Agent, or Firm* — Rankin, Hill & Clark LLP (57) ABSTRACT

A rotor core of a rotating electric machine includes a cooling passage. The cooling passage includes an upstream end that opens in a first end surface of the rotor core and a downstream end that opens in a second end surface of the rotor core. The rotating electric machine is further equipped with a rectifying structure for converting the flow direction of gas an axial direction and a circumferential direction of the rotor. The rectifying structure is fixed to a non-rotating portion in a casing so as to face a rotor in an axial direction.

11 Claims, 8 Drawing Sheets (56) References Cited

U.S. PATENT DOCUMENTS

| | | | |
|---|---|---|---|
| 11,309,756 B2* | 4/2022 | Kim | H02K 1/20 |
| 2010/0194220 A1* | 8/2010 | Tatematsu | H02K 1/32 |
| | | | 310/61 |
| 2010/0320878 A1* | 12/2010 | Izumi | H02K 9/06 |
| | | | 310/60 R |
| 2013/0221772 A1* | 8/2013 | Miyamoto | H02K 9/19 |
| | | | 310/54 |
| 2015/0303765 A1* | 10/2015 | Akiyoshi | H02K 5/207 |
| | | | 310/59 |
| 2017/0328269 A1* | 11/2017 | Yamashita | F01P 3/20 |
| 2018/0163747 A1* | 6/2018 | Hayamitsu | A47L 9/2842 |
| 2019/0027987 A1* | 1/2019 | Fröhlich | H02K 1/32 |
| 2019/0027998 A1* | 1/2019 | Takaki | F04D 29/624 |
| 2019/0074742 A1* | 3/2019 | Matsumoto | H02K 9/19 |
| 2019/0229571 A1* | 7/2019 | Yasuda | H02K 1/32 |
| 2020/0204021 A1* | 6/2020 | Kim | H02K 9/19 |
| 2020/0244124 A1* | 7/2020 | Kang | H02K 1/32 |
| 2022/0186735 A1* | 6/2022 | Choi | F04D 29/444 |
| 2022/0209603 A1* | 6/2022 | Kim | H02K 5/203 |
| 2022/0282666 A1* | 9/2022 | Myoren | F04D 29/08 |
| 2024/0055932 A1* | 2/2024 | Ueguchi | H02K 5/207 |

FOREIGN PATENT DOCUMENTS

| | | | | |
|---|---|---|---|---|
| JP | H09261923 | A | * 10/1997 | |
| JP | 3982491 | B2 | * 9/2007 | H02K 9/10 |
| JP | 2008-035584 | A | 2/2008 | |
| KR | 20010045050 | A | * 6/2001 | H02K 9/04 |

* cited by examiner

ROTATING ELECTRIC MACHINE

CROSS-REFERENCE TO RELATED APPLICATIONS

This application is based upon and claims the benefit of priority from Japanese Patent Application No. 2022-156430 filed on Sep. 29, 2022, the contents of which are incorporated herein by reference.

BACKGROUND OF THE INVENTION

Field of the Invention

The present invention relates to a rotating electric machine.

Description of the Related Art

When a rotating electric machine generates heat and reaches a high temperature, the loss increases and the efficiency decreases. Therefore, it is desirable to cool the rotating electric machine. For example, in JP 2008-035584 A, a ventilation fan is provided integrally with a rotor for cooling the rotor of a rotating electric machine. Convection is generated in the casing by the blades of the ventilation fan to cool the rotor.

SUMMARY OF THE INVENTION

In order to further enhance the rotor cooling performance, it is desired to make the introduced air flow more efficiently.

An object of the present invention is to solve the aforementioned problem.

According to an aspect of the present invention, a rotating electric machine is provided. The rotating electric machine includes a shaft, a rotor fixed to the shaft, a stator surrounding the rotor, and a casing accommodating the rotor and the stator, the rotating electric machine being configured to cool a part to be cooled, by a gas flowing in the casing, wherein the rotor includes a rotor core supported by the shaft, the rotor core includes a cooling passage configured to allow communication between a first end surface which is one end surface of the rotor core in an axial direction of the rotor core to a second end surface which is another end surface of the rotor core, the gas flowing through the cooling passage, the cooling passage includes an upstream end that opens in the first end surface and a downstream end that opens in the second end surface, the rotating electric machine further includes a rectifying structure configured to convert a flow direction of the gas between the axial direction and a circumferential direction of the rotor, and the rectifying structure is fixed to a non-rotating portion in the casing so as to face the rotor in the axial direction.

According to the present invention, since the gas flowing in the casing is rectified by the rectifying structure, it is possible to cause the gas to efficiently flow into the cooling passage, so that the cooling performance of the rotor can be enhanced.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
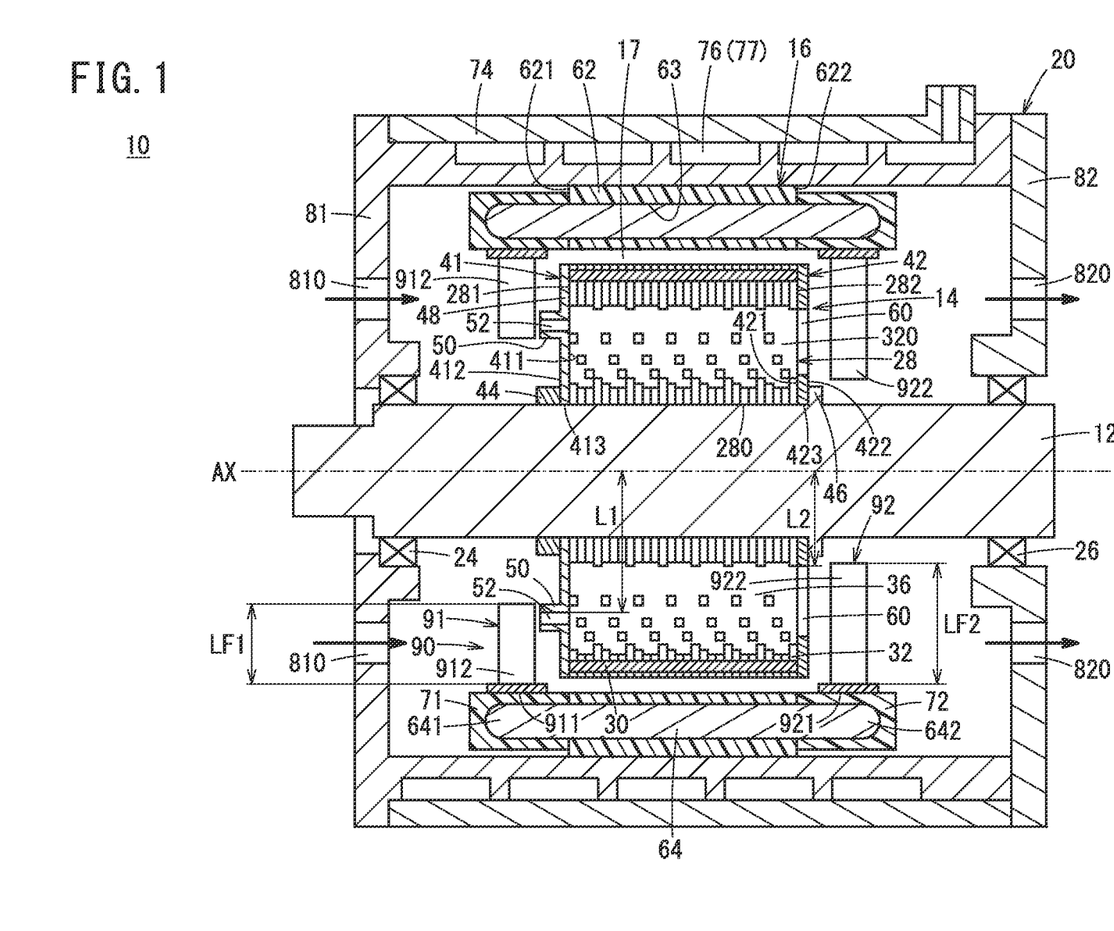
FIG. 1 is a schematic overall view of a rotating electric machine according to an embodiment of the present invention.

A rotating electric machine 10 shown in FIG. 1 is an electric motor or an electrical power generator. The use of the rotating electric machine 10 is not particularly limited, and the rotating electric machine 10 is also used for vehicles such as two-wheeled vehicles and four-wheeled vehicles, aircrafts, ships, and the like. When the rotating electric machine 10 is an electric motor, for example, the rotating electric machine 10 can be used as a power source for driving a propeller 106 (see FIG. 8) of a flying object such as an aircraft. The rotating electric machine 10 has a shaft 12 rotatably supported, a rotor 14 fixed to the shaft 12, and a stator 16 surrounding the rotor 14. The rotating electric machine 10 further includes a casing 20 for accommodating the shaft 12, the rotor 14, and the stator 16.

The shaft 12 is disposed on an axis AX of the rotating electric machine 10. An axis AX is a central axis of the shaft 12. The shaft 12 is rotatably supported by a first bearing 24 and a second bearing 26 disposed at one end and another end of the casing 20, respectively. One end of the shaft 12 is connected to a load (for example, the propeller 106) via a transmission 102 (see FIG. 8), for example. The shaft 12 may be directly connected to the load without via the transmission 102.

The shaft 12 and the rotor 14 rotate integrally. The rotor 14 includes a rotor core 28 supported by the shaft 12 and a plurality of magnets 30 fixed to the rotor core 28. The rotor core 28 has a plurality of electromagnetic steel plates 32 laminated in the axial direction of the rotor 14. The rotor core 28 is a laminated body formed by laminating the plurality of electromagnetic steel plates 32. The rotor core 28 has a cylindrical shape having a central hole 280. The shaft 12 is inserted into the central hole 280 of the rotor core 28.

The rotor core 28 has a first end surface 281 and a second end surface 282 spaced apart in the axial direction. The first end surface 281 of the rotor core 28 is disposed between the first bearing 24 and the second end surface 282. The second end surface 282 of the rotor core 28 is disposed between the second bearing 26 and the first end surface 281. The rotor core 28 has a cooling passage 36 allowing communication between the first end surface 281 and the second end surface 282. Hole portions 320 formed in the plurality of electromagnetic steel plates 32 are connected to each other to form the cooling passage 36. The cooling passage 36 is formed radially inward of the rotor 14 relative to the magnets 30.

Figure 2:
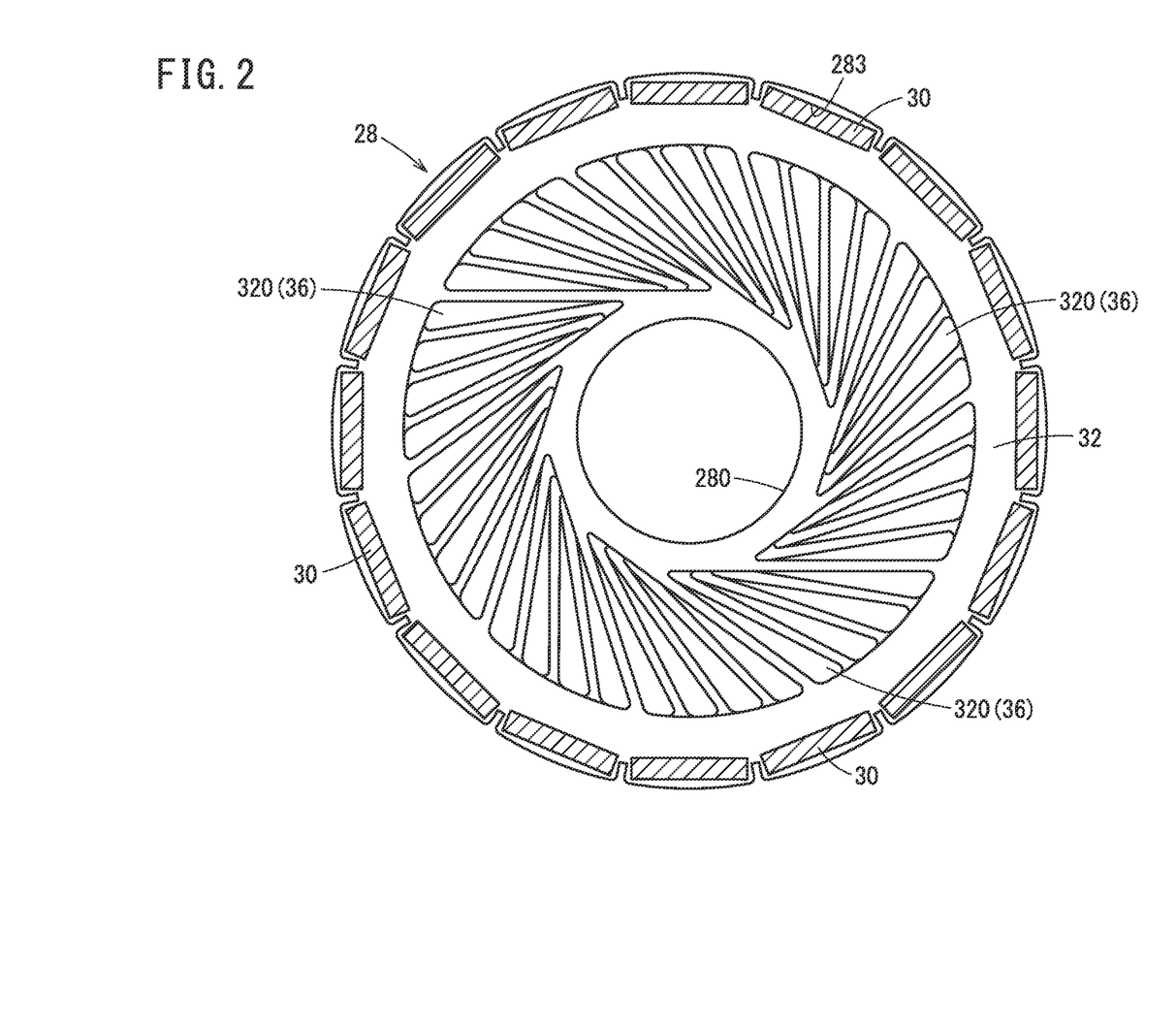
FIG. 2 is a plan view of electromagnetic steel plates constituting the rotor core.

As shown in FIG. 2, each of the electromagnetic steel plates 32 has the plurality of hole portions 320 formed at intervals in the circumferential direction. Accordingly, the rotor core 28 has the plurality of cooling passages 36 formed at circumferentially spaced intervals. In FIG. 2, each of the hole portions 320 is formed in a triangular shape, but the shape of the hole portion 320 is not particularly limited, and other shapes (rectangular or trapezoidal shape) may be used.

In the present embodiment shown in FIG. 1, the plurality of electromagnetic steel plates 32 are arranged, with the phase in the circumferential direction being shifted by a predetermined angle, in units of one plate or in units of a plurality of plates. Therefore, the hole portions 320 formed in the plurality of electromagnetic steel plates 32 are connected to each other, so that each of the cooling passages 36 is formed in a spiral shape with the axis AX as the center. Since each of the cooling passages 36 extends spirally as described above, a swirling flow is generated in the cooling passage 36 by rotation of the rotor core 28.

As shown in FIG. 2, the plurality of magnets 30 are arranged at intervals in the circumferential direction on the outer circumferential portion of the rotor core 28 (electromagnetic steel plate 32). The outer circumferential portion of the rotor core 28 (electromagnetic steel plate 32) has a plurality of magnet mounting holes 283 formed at intervals in the circumferential direction. The plurality of magnet mounting holes 283 are formed radially outward relative to the plurality of hole portions 320. The plurality of magnets 30 are respectively inserted into the plurality of magnet mounting holes 283. Each of the magnets 30 is a permanent magnet.

As shown in FIG. 1, the rotor 14 further includes a first retaining member 41 disposed on one end side of the rotor core 28 in the axial direction of the rotating electric machine 10, and a second retaining member 42 disposed on the other end side of the rotor core 28.

The first retaining member 41 abuts against the first end surface 281 of the rotor core 28. The first retaining member 41 has an inner surface 411 facing the rotor core 28 and an outer surface 412 opposite to the inner surface 411, and the inner surface 411 abuts against the rotor core 28. The shaft 12 is inserted through a first insertion hole 413 formed at the center of the first retaining member 41. An inner circumferential portion of the first retaining member 41 is locked by a locking ring 44 fixed to the shaft 12.

The second retaining member 42 abuts against the second end surface 282 of the rotor core 28. The second retaining member 42 has an inner surface 421 facing the rotor core 28 and an outer surface 422 opposite to the inner surface 421, and the inner surface 421 abuts against the rotor core 28. The shaft 12 is inserted through a second insertion hole 423 formed at the center of the second retaining member 42. An inner circumferential portion of the second retaining member 42 is locked by an annular locking projection 46 fixed to the shaft 12. Since the rotor core 28 is retained between the first retaining member 41 and the second retaining member 42, the rotor core 28 is positioned in the axial direction with respect to the shaft 12.

Figure 3:
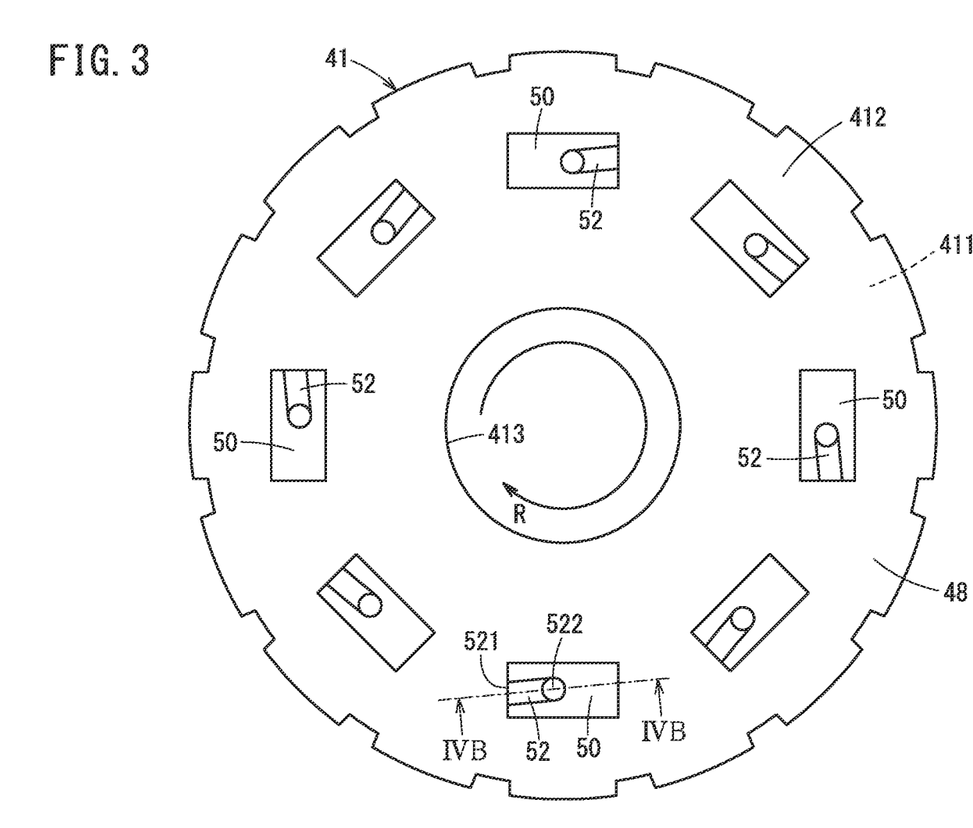
FIG. 3 is a plan view of a first retaining member.

As shown in FIG. 3, the first retaining member 41 is formed in an annular shape. The first retaining member 41 has a protruding portion 50 protruding toward the outside of the rotor 14 in the axial direction (see FIG. 1 as well). The first retaining member 41 has a flat annular base plate portion 48. The protruding portion 50 protrudes from the base plate portion 48 in the axial direction. The plurality of protruding portions 50 are circumferentially spaced from each other. In FIG. 3, the plurality of protruding portions 50 are arranged at equal intervals in the circumferential direction.

As shown in FIG. 1, the first retaining member 41 has an inlet-side through hole 52 communicating with the cooling passage 36. When the rotor 14 is rotated, the first retaining member 41 introduces a cooling gas (air) into the cooling passages 36 through the inlet-side through hole 52. As shown in FIG. 3, in the first retaining member 41, the plurality of inlet-side through holes 52 are formed at intervals in the circumferential direction. Each of the inlet-side through holes 52 is a tubular passage. The plurality of inlet-side through holes 52 are formed in the plurality of protruding portions 50, respectively.

Figure 4A:
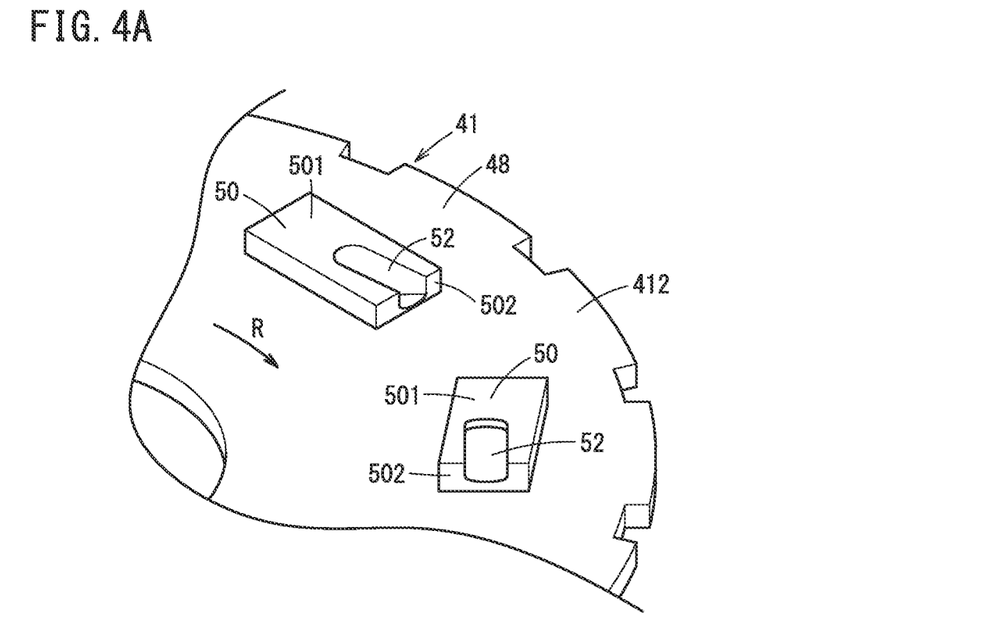
FIG. 4A is a cross-sectional perspective view of the first retaining member.

As shown in FIG. 4A, each of the protruding portions 50 has a protruding end surface 501 and an end surface facing forward in the rotational direction R of the rotor 14 (hereinafter referred to as a "rotational front end surface 502"). The inlet-side through hole 52 opens at the protruding end surface 501 and the rotational front end surface 502 of the protruding portion 50.

Figure 4B:
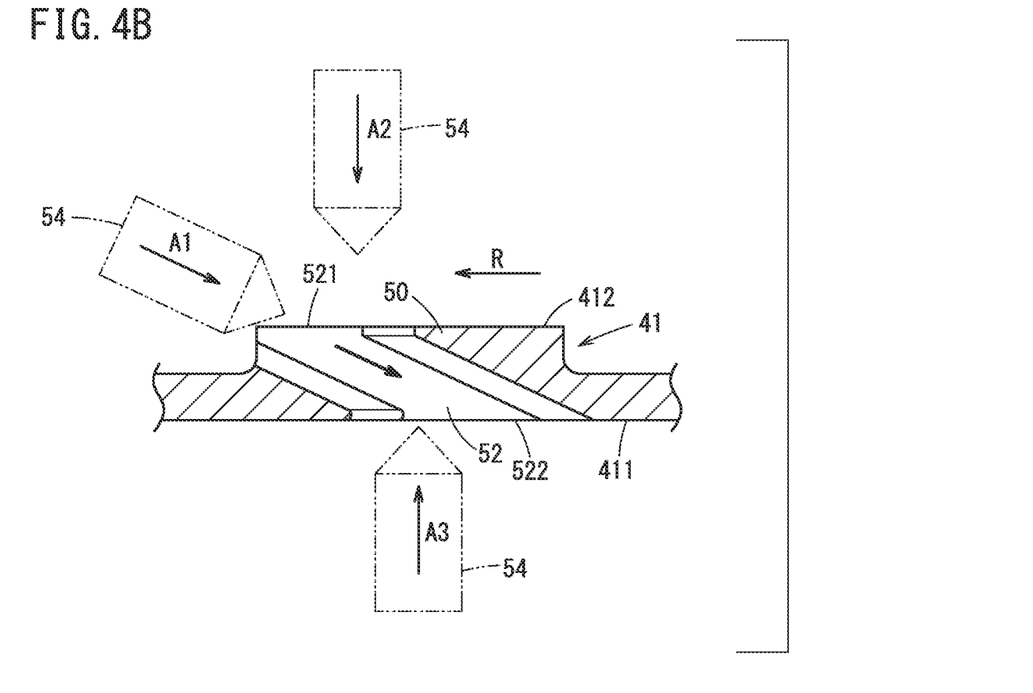
FIG. 4B is a cross-sectional view taken along line IVB-IVB in FIG. 3.

As shown in FIG. 4B, the inlet-side through hole 52 is inclined with respect to the axis AX (see FIG. 1) of the rotor 14. The inlet-side through hole 52 is formed in the protruding portion 50 such that the inlet-side through hole 52 is continuously inclined with respect to the axis AX. The inlet-side through hole 52 is inclined from the outer surface 412 of the first retaining member 41 toward the inner surface 411 thereof in a direction opposite to the rotational direction R of the rotor 14.

An example of a method for forming such an inlet-side through hole 52 will be described. For example, a through hole is formed by moving a cutting tool 54 (drill or the like) relative to the material of the first retaining member 41 in a direction A1 in FIG. 4B (a direction inclined with respect to the thickness direction of the first retaining member 41). Next, in order to remove the sharp edge of the through hole, the cutting tool 54 is moved in a direction A2 and a direction A3 (thickness directions of the first retaining member 41) in order to cut off the edge. The order of processing in the direction A2 and the direction A3 may be reversed.

The inlet-side through hole 52 has an upstream end opening 521 which opens on the outer surface of the protruding portion 50 and a downstream end opening 522 which opens on the inner surface 411 of the first retaining member 41.

As shown in FIG. 3, each of the inlet-side through holes 52 is inclined with respect to the circumferential direction of the rotor 14 such that the upstream end opening 521 of the inlet-side through hole 52 is located outside the downstream end opening 522 in the radial direction of the rotor 14.

Figure 5A:
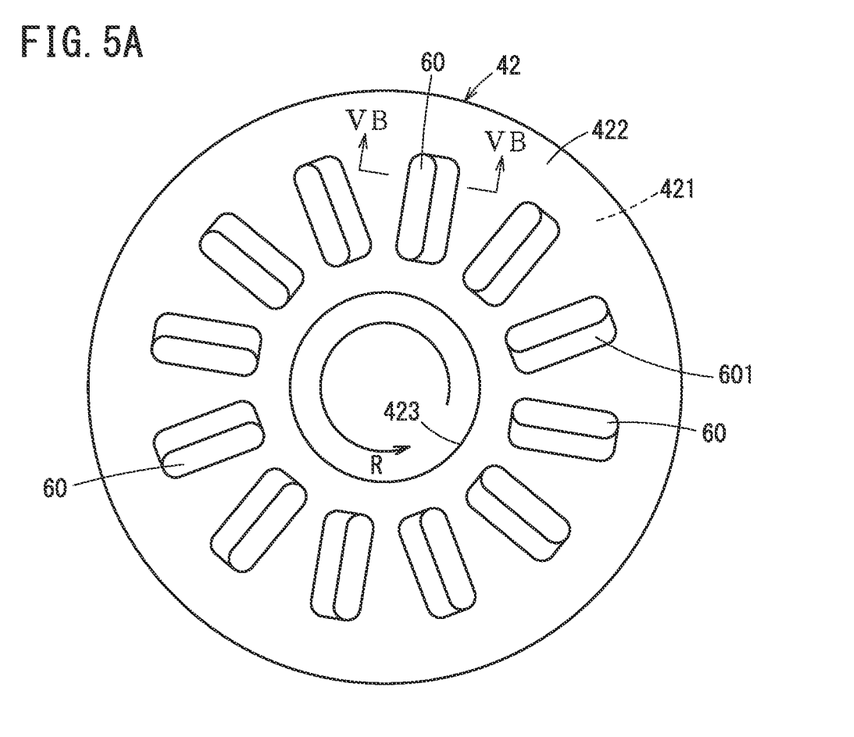
FIG. 5A is a plan view of a second retaining member.

As shown in FIG. 1, the second retaining member 42 is formed in a flat plate shape. The second retaining member 42 has an outlet-side through hole 60 communicating with the cooling passage 36. When the rotor 14 is rotated, the second retaining member 42 discharges gas from the cooling passage 36 through the outlet-side through hole 60. The outlet-side through hole 60 penetrates from one end surface (inner surface 421) of the second retaining member 42 to the other end surface (outer surface 422). As shown in FIG. 5A, in the second retaining member 42, the plurality of outlet-side through holes 60 are formed at intervals in the circumferential direction. The outlet-side through holes 60 each have an elongated hole shape extending in the radial direction of the rotor 14.

The plurality of outlet-side through holes 60 are provided radially around the second insertion hole 423. In the present embodiment, the number of the outlet-side through holes 60 is larger than the number of the inlet-side through holes 52 (FIG. 3). The number of the outlet-side through holes 60 may be equal to or less than the number of the inlet-side through holes 52. The sum of the flow path areas of the plurality of outlet-side through holes 60 is larger than the sum of the flow path areas of the plurality of inlet-side through holes 52.

Figure 5B:
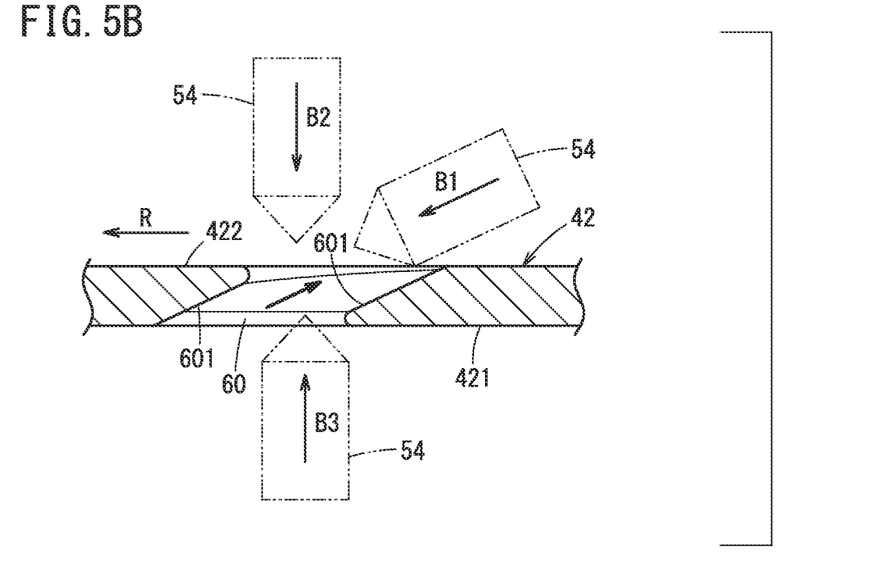
FIG. 5B is a cross-sectional view taken along line VB-VB in FIG. 5A.

As shown in FIG. 5B, each of the outlet-side through holes 60 is inclined with respect to the axis AX (see FIG. 1) of the rotor 14. The outlet-side through hole 60 is inclined from the inner surface 421 of the second retaining member 42 toward the outer surface 422 in the direction opposite to the rotational direction R of the rotor 14. The outlet-side through hole 60 has inclined inner surfaces 601 which face each other in the circumferential direction of the rotor 14 and are inclined with respect to the axis AX of the rotor 14. One inclined inner surface 601 and another inclined inner surface 601 are parallel to each other.

An example of a method for forming such an outlet-side through hole 60 will be described. For example, a through hole is formed by moving a cutting tool 54 (drill or the like) relative to the material of the second retaining member 42 in a direction B1 in FIG. 5B (a direction inclined with respect to the thickness direction of the second retaining member 42). Next, in order to remove the sharp edge of the through hole, the cutting tool 54 is moved in a direction B2 and a direction B3 (thickness directions of the second retaining member 42) in order to cut off the edge. The order of processing in the direction B2 and the direction B3 may be reversed.

In FIG. 1, when the rotor 14 constructed as described above is rotated, the rotor 14 introduces a cooling gas (air) into the cooling passages 36 through the inlet-side through holes 52 and discharges the gas from the cooling passages 36 through the outlet-side through holes 60.

The stator 16 is formed in a hollow cylindrical shape and is fixed to the inner circumferential surface of the casing 20. An annular space extending in the axial direction is formed between the inner circumferential surface of the stator 16 and the outer circumferential surface of the rotor 14. The annular space is a gas flow path 17 through which gas flows. The stator 16 includes a stator core 62 and coils 64 held by the stator core 62. The coils 64 are inserted through a plurality of slots 63 formed in the stator core 62. The coils 64 have first coil end portions 641 projecting axially from one end surface 621 of the stator core 62, and second coil end portions 642 projecting axially from another end surface 622 of the stator core 62.

The stator 16 has a mold portion that covers the first coil end portions 641 and the second coil end portions 642. Specifically, the mold portion includes a first resin mold 71 and a second resin mold 72. The first resin mold 71 covers the first coil end portions 641 and is arranged along the annular one end surface 621 of the stator core 62. The first resin mold 71 is formed in an annular shape extending in the circumferential direction around the axis AX. The second resin mold 72 covers the second coil end portions 642 and is disposed along the annular other end surface 622 of the stator core 62. The second resin mold 72 is formed in an annular shape extending in the circumferential direction centered about the axis AX.

The casing 20 has a cylindrical circumferential wall portion 74 surrounding the stator 16, a first end wall portion 81 constituting one end portion of the casing 20 in the axial direction, and a second end wall portion 82 constituting the other end portion of the casing 20 in the axial direction. A water cooling passage 76 extending spirally is formed in the circumferential wall portion 74. That is, the circumferential wall portion 74 has a water jacket 77. The stator 16 is cooled by the water jacket 77. The form of the stator 16 of the rotating electric machine 10 is not limited. For example, an air cooling system in which the circumferential wall portion 74 is cooled by being exposed to a gas (air) may be employed.

The first end wall portion 81 has a plurality of inflow ports 810 for introducing a cooling gas (air) into the casing 20. The second end wall portion 82 has a plurality of outflow ports 820 for discharging the cooling gas (air) from the casing 20. For example, the gas is pressure-fed into the casing 20 through the inflow ports 810 by a blower (a fan 108 shown in FIG. 8 or a pump) disposed outside the rotating electric machine 10, and introduced into the cooling passage 36 in the rotor 14. The casing 20 may be provided with a gas circulation path as follows. In the circulation path, for example, the gas discharged from the cooling passages 36 is cooled in the casing 20 by, for example, the water jacket 77, and the cooled gas returns to the space around the first retaining member 41.

The rotating electric machine 10 is further provided with a rectifying structure 90 for rectifying the flow of a gas which is convected in the casing 20. The rectifying structure 90 converts the gas flow between the radial and axial directions of the rotor 14. The rectifying structure 90 is fixed to a non-rotating portion in the casing 20 so as to face the rotor 14 in the axial direction.

In the present embodiment, the non-rotating portion is the stator 16. In place of the stator 16, the non-rotating portion to which the rectifying structure 90 is fixed may be the casing 20 or another supporting member fixed to the casing 20. When the casing 20 is a non-rotating portion, a support portion protruding from the inner wall of the casing 20 is added, or a portion (for example, an extension portion) to be supported by the casing 20 is added to the rectifying structure 90 itself.

The rectifying structure 90 has an inlet-side rectifying member 91 facing the upstream end of the cooling passage 36 and an outlet-side rectifying member 92 facing the downstream end of the cooling passage 36. The rectifying structure 90 is fitted to an inner circumferential surface of the mold portion. Specifically, the outer circumferential portion of the inlet-side rectifying member 91 is fitted into the inner circumferential surface of the first resin mold 71, whereby the inlet-side rectifying member 91 is fixed to the stator 16. The outer circumferential portion of the outlet-side rectifying member 92 is fitted into the inner circumferential surface of the second resin mold 72, whereby the outlet-side rectifying member 92 is fixed to the stator 16.

The inlet-side rectifying member 91 is disposed between the first bearing 24 and the first end surface 281 of the rotor core 28. The inlet-side rectifying member 91 has a first frame 911 extending in the circumferential direction around the axis AX, and a plurality of inlet-side fins 912 projecting from the inner circumferential surface of the first frame 911 toward the shaft 12. The outer circumferential surface of the first frame 911 is held by the inner circumferential surface of the first resin mold 71.

Figure 6:
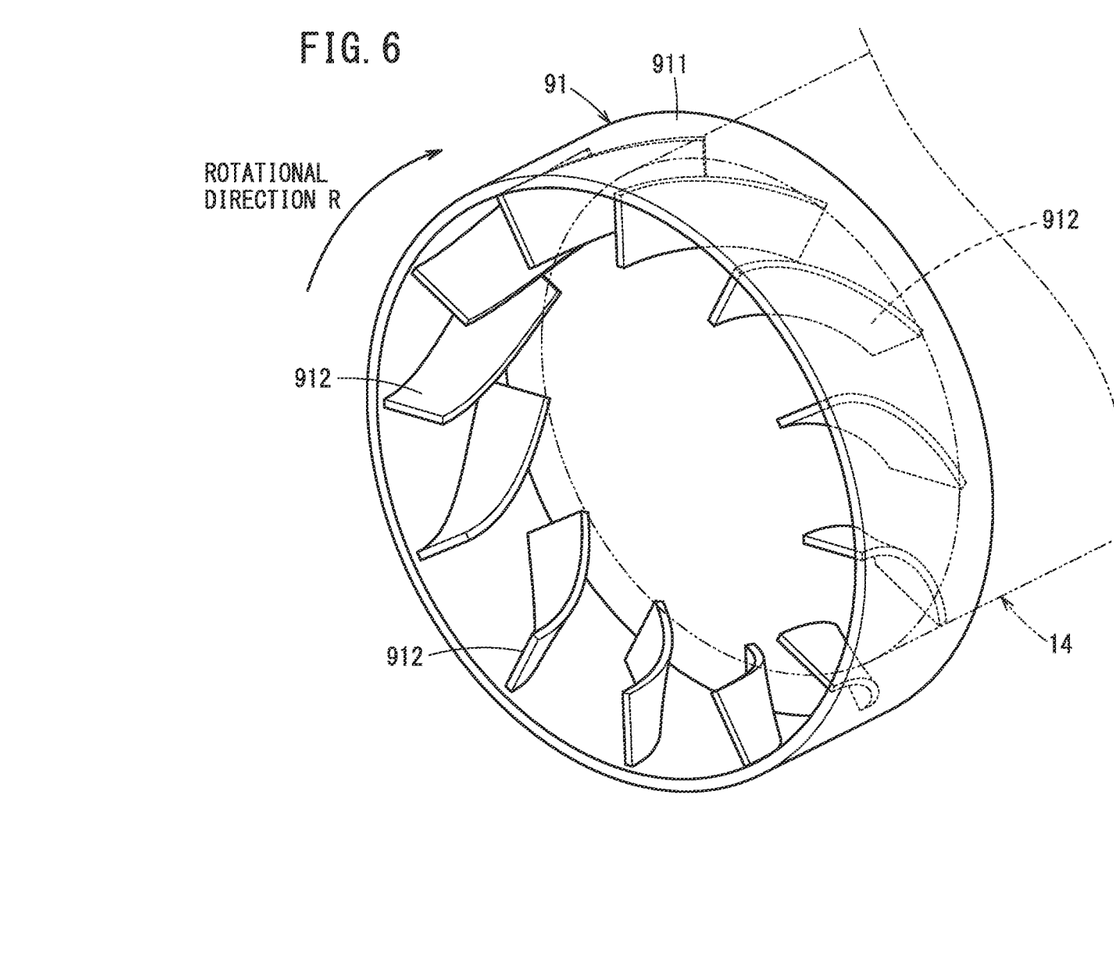
FIG. 6 is a perspective view of an inlet-side rectifying member.

As shown in FIG. 6, in the present embodiment, the first frame 911 is formed in a cylindrical shape (annular shape). It should be noted that the first frame 911 may be formed in a C-shape in which a part of the circumferential direction is cut out.

The plurality of inlet-side fins 912 project radially inward from the inner circumferential surface of the first frame 911 and are arranged at equal intervals in the circumferential direction. The plurality of inlet-side fins 912 rectify (convert) the axial flow in the circumferential direction. The shape of the plurality of inlet-side fins 912 is formed so as to convert the axial flow of the gas toward the rotor 14, into the rotational direction R of the rotor 14. Specifically, each of the inlet-side fins 912 is curved so as to change its direction from the axial direction to the circumferential direction as a distance from the rotor 14 decreases.

As shown in FIG. 1, the length of the plurality of inlet-side fins 912 in the radial direction is set such that the plurality of inlet-side fins 912 face the inlet-side through holes 52 of the rotor 14 in the axial direction. It is preferable for the inner end of each of the inlet-side fins 912 to be located at the same position as the innermost position of each of the inlet-side through holes 52 in the radial direction of the rotor 14 (the position of the inlet-side through hole 52 closest to the axis AX) or at a position radially inward relative to the innermost position.

When the rotor 14 rotates, the flow direction of the gas flowing toward the inlet-side rectifying member 91 in the casing 20 is changed from the axial direction to the circumferential direction (rotational direction R of the rotor 14) by the inlet-side rectifying member 91, and becomes a swirling flow. The gas whose flow direction has been changed in the circumferential direction is introduced into the cooling passages 36 in the rotor core 28 through the inlet-side through holes 52 of the first retaining member 41. A part of the gas whose flow direction is changed in the circumferential direction is also introduced into the gas flow path 17 between the rotor 14 and the stator 16. Since the rotor 14 rotates, the gas introduced into the gas flow path 17 is directed to the outlet-side rectifying member 92 as a swirling flow.

The outlet-side rectifying member 92 is disposed between the second bearing 26 and the second end surface 282 of the rotor core 28. The outlet-side rectifying member 92 has a second frame 921 extending in the circumferential direction around the axis AX and a plurality of outlet-side fins 922 projecting from the inner circumferential surface of the second frame 921 toward the shaft 12. The outer circumferential surface of the second frame 921 is held by the inner circumferential surface of the second resin mold 72.

Figure 7:
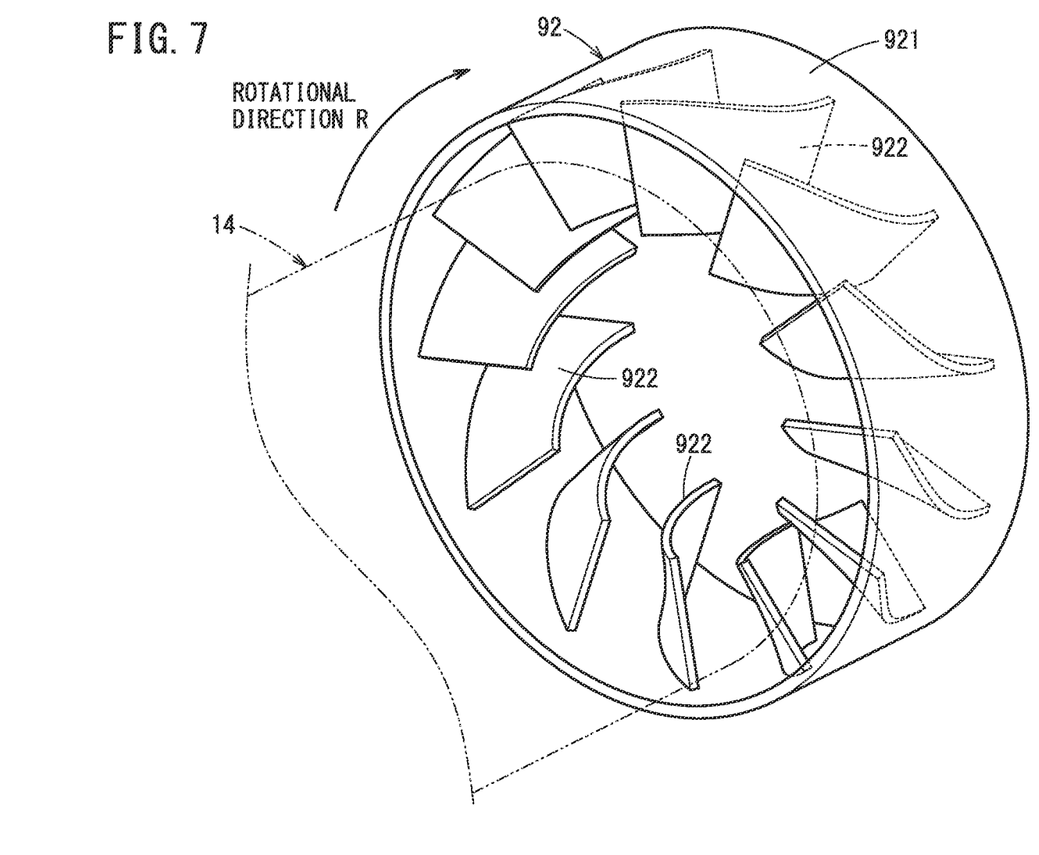
FIG. 7 is a perspective view of an outlet-side rectifying member.

As shown in FIG. 7, in the present embodiment, the second frame 921 is formed in a cylindrical shape (annular shape). It should be noted that the second frame 921 may be formed in a C-shape in which a part of the circumferential direction is cut out.

The plurality of outlet-side fins 922 project radially inward from the inner circumferential surface of the second frame 921 and are arranged at equal intervals in the circumferential direction. The plurality of outlet-side fins 922 convert the circumferential flow in the axial direction. The plurality of outlet-side fins 922 rectify (convert) the flow direction of the gas flowing out from the cooling passages 36 and the gas flow path 17 in the axial direction of the rotor 14. The plurality of outlet-side fins 922 are formed so as to convert the flow of the gas flowing out from the rotor 14 and the gas flow path 17 into the axial direction. Specifically, each of the outlet-side fins 922 is curved so as to change its direction from the circumferential direction to the axial direction as a distance from the rotor 14 increases.

As shown in FIG. 1, the length of the plurality of outlet-side fins 922 in the radial direction is set such that the plurality of outlet-side fins 922 face the outlet-side through holes 60 of the rotor 14 in the axial direction. It is preferable for the inner end of each of the outlet-side fins 922 to be located at the same position as the innermost position of each of the outlet-side through holes 60 in the radial direction of the rotor 14 (the position of the outlet-side through hole 60 closest to the axis AX) or at a position radially inward relative to the innermost position.

When the rotor 14 rotates, the flow direction of the gas that has passed through the cooling passages 36 of the rotor core 28 and is discharged from the rotor 14 via the outlet-side through holes 60 of the second retaining member 42 is changed from the circumferential direction (rotational direction R of the rotor 14) to the axial direction by the outlet-side rectifying member 92. Further, the flow direction of the gas discharged from the gas flow path 17 in the state of a swirling flow is also changed from the circumferential direction to the axial direction by the outlet-side rectifying member 92.

A shortest distance L1 between each of the inlet-side through holes 52 in the radial direction of the rotor 14 and the central axis (axis AX) of the shaft 12 is different from a shortest distance L2 between each of the outlet-side through holes 60 in the radial direction and the central axis (axis AX) of the shaft 12. In the present embodiment, the distance L1 is larger than the distance L2. That is, the innermost portion of each of the inlet-side through holes 52 in the radial direction of the rotor 14 is positioned radially outward relative to the innermost portion of each of the outlet-side through holes 60.

A length LF1 of each of the plurality of inlet-side fins 912 in the radial direction is different from a length LF2 of each of the plurality of outlet-side fins 922 in the radial direction. In the present embodiment, since the distance L1 is larger than the distance L2, the length LF1 of each of the plurality of inlet-side fins 912 in the radial direction is shorter than the length LF2 of each of the plurality of outlet-side fins 922 in the radial direction.

In the present embodiment, the rectifying structure 90 includes both the inlet-side rectifying member 91 and the outlet-side rectifying member 92, but may include only one of the inlet-side rectifying member 91 and the outlet-side rectifying member 92. Each of the inlet-side through holes 52 provided in the first retaining member 41 may not be a hole inclined with respect to the axis AX, but may be a hole penetrating the first retaining member 41 in parallel with the axis AX. Each of the outlet-side through holes 60 provided in the second retaining member 42 may be a hole that penetrates the second retaining member 42 in parallel with the axis AX instead of a hole that is inclined with respect to the axis AX.

Figure 8:
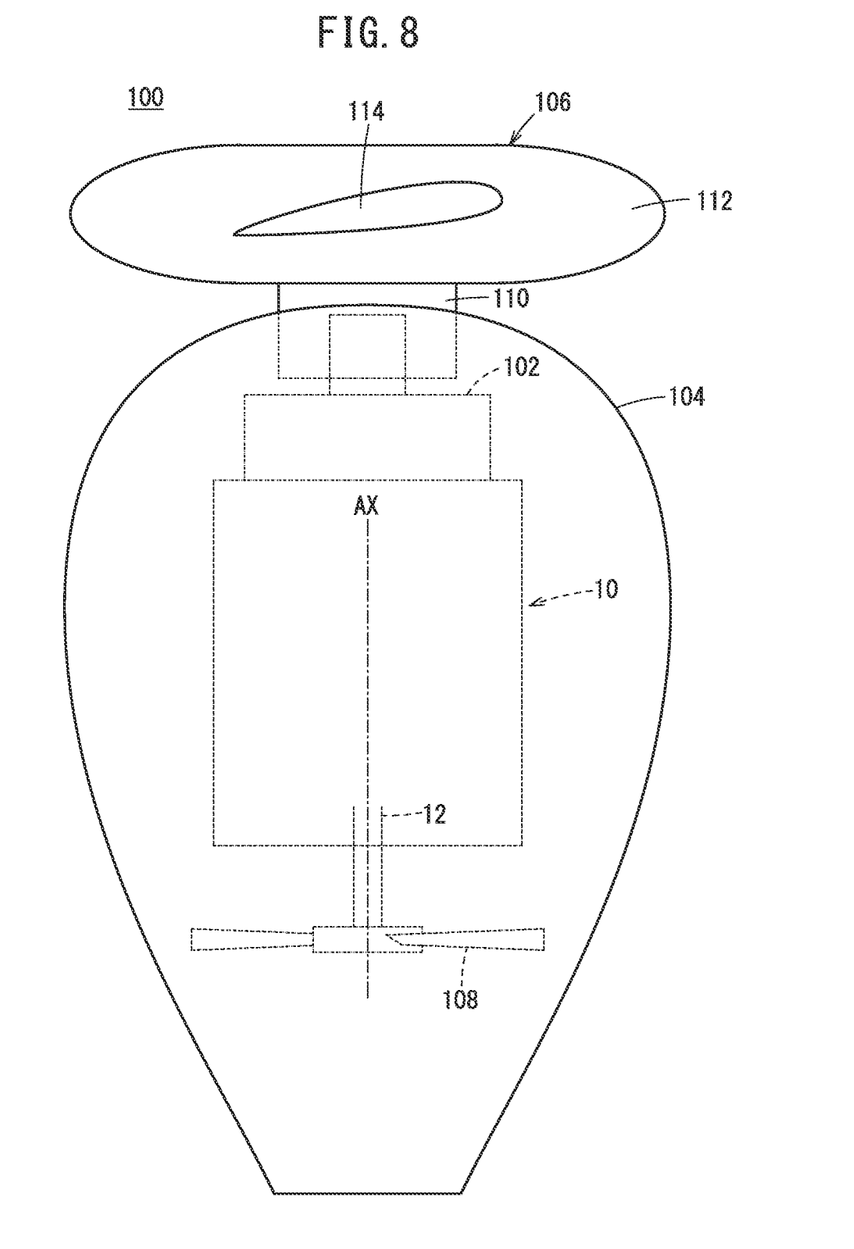
FIG. 8 is a schematic diagram of a propeller device provided with a rotating electric machine.

As shown in FIG. 8, the rotating electric machine 10 can be applied to a propeller device 100. The rotating electric machine 10 is not limited to a power source for the propeller device 100, but can be used as a power source for other devices. The propeller device 100 is provided with the rotating electric machine 10, the transmission 102 attached to the rotating electric machine 10, an accommodation member 104 for accommodating the rotating electric machine 10 and the transmission 102, and the propeller 106 connected to the transmission 102.

The propeller device 100 is used for a vertical take-off and landing aircraft, for example. Therefore, the rotating electric machine 10 is disposed such that the axis AX of the rotating electric machine 10 is directed in the vertical direction when the propeller device 100 is in use. The propeller device 100 may adopt a configuration in which the axis AX of the rotating electric machine 10 is directed substantially in the horizontal direction when the propeller device 100 is in use.

The fan 108 for generating an air flow in the accommodation member 104 is attached to a lower end of the shaft 12 of the rotating electric machine 10. The transmission 102 is, for example, a planetary gear mechanism, and is disposed on an upper part of the rotating electric machine 10. The propeller 106 includes a propeller shaft 110 connected to an output shaft of the transmission 102, a hub 112 provided at an upper end of the propeller shaft 110, and a plurality of blades 114 projecting radially outward from the hub 112.

According to the present embodiment, the following effects are obtained.

As shown in FIG. 1, the rotating electric machine 10 is provided with the rectifying structure 90 configured to convert a flow direction of the gas between the axial direction and the circumferential direction of the rotor 14, and the rectifying structure 90 is fixed to the non-non-rotating portion in the casing 20 so as to face the rotor 14 in the axial direction. According to this configuration, since the gas flowing in the casing 20 is rectified by the rectifying structure 90, it is possible to cause the gas to efficiently flow into the cooling passage 36, so that the cooling performance of the rotor 14 can be enhanced.

Since the rectifying structure 90 includes the inlet-side rectifying member 91 including the plurality of inlet-side fins 912 configured to convert the flow direction from the axial direction into the circumferential direction, the inlet-side rectifying member 91 can rectify the gas flow on an inflow side of the cooling passage 36.

Since the rectifying structure 90 includes the outlet-side rectifying member 92 including the plurality of outlet-side fins 922 configured to convert the flow direction from the circumferential direction into the axial direction, the outlet-side rectifying member 92 can rectify the gas flow on the outflow side of the cooling passage 36.

Since the rectifying structure 90 includes the inlet-side rectifying member 91 and the outlet-side rectifying member 92, the inlet-side rectifying member 91 can rectify the gas flow on the inflow side of the cooling passage 36, and the outlet-side rectifying member 92 can rectify the gas flow on the outflow side of the cooling passage 36. As a result, it is possible to cause the gas to flow through the cooling passage 36 more efficiently.

Since the non-rotating portion is the stator 16 and the rectifying structure 90 is fixed to the inner circumferential surface of the stator 16, the rectifying structure 90 can be disposed at the non-rotating portion in the casing 20 without using a special fixing member.

Since the rectifying structure 90 is fitted to the inner circumferential surface of the mold portion (one or both of the first resin mold 71 and the second resin mold 72), a simple fixing structure by fitting can be adopted by taking advantage of the degree of freedom in designing the shape of the mold portion.

Since the inlet-side rectifying member 91 is disposed between the first bearing 24 and the first end surface 281, the inlet-side rectifying member 91 can be disposed close to the rotor 14. Thus, the stagnation of gas in the gap between the inlet-side rectifying member 91 and the rotor 14 can be suppressed, and the gas flow can be promoted.

Since the outlet-side rectifying member 92 is disposed between the second bearing 26 and the second end surface 282, the outlet-side rectifying member 92 can be disposed close to the rotor 14. Thus, the stagnation of gas in the gap between the outlet-side rectifying member 92 and the rotor 14 can be suppressed, and the gas flow can be promoted.

The inclined inlet-side through hole 52 provided in the first retaining member 41 promotes the introduction of the cooling gas into the cooling passage 36 in the rotor core 28, and the inclined outlet-side through hole 60 provided in the second retaining member 42 promotes the discharge of the gas from the cooling passage 36. As a result, this configuration can cause the gas to efficiently flow through the cooling passage 36, so that the cooling performance of the rotor 14 can be enhanced.

The length of each of the plurality of inlet-side fins 912 in the radial direction is set such that the plurality of inlet-side fins 912 face the inlet-side through hole 52 in the axial direction. According to this configuration, the gas flow in the cooling passage 36 can be further promoted by the synergistic effect of the inlet-side fins 912 and the inlet-side through hole 52.

The length of each of the plurality of outlet-side fins 922 in the radial direction is set such that the plurality of outlet-side fins 922 face the outlet-side through hole 60 in the axial direction. According to this configuration, the gas flow in the cooling passage 36 can be further promoted by the synergistic effect of the outlet-side fins 922 and the outlet-side through hole 60.

The shortest distance L1 in the radial direction between the inlet-side through hole 52 and the central axis of the shaft 12, and the shortest distance L2 in the radial direction between the outlet-side through hole 60 and the central axis are different, and the length LF1 of each of the plurality of inlet-side fins 912 in the radial direction and the length LF2 of each of the plurality of outlet-side fins 922 in the radial direction are different. Since the length LF1 of each of the inlet-side fins 912 and the length LF2 of each of the outlet-side fins 922 are different in accordance with the difference in the radial position of the inlet-side through hole 52 and the outlet-side through hole 60, it is possible to reduce the influence of the weight increase accompanying the provision of the inlet-side rectifying member 91 and the outlet-side rectifying member 92.

The first retaining member 41 includes the protruding portion 50 protruding to the outside of the rotor 14 in the axial direction. As shown in FIG. 4B, since the inlet-side through hole 52 is formed in the protruding portion 50 so as to be continuously inclined with respect to the axis AX, the inflow of the gas into the cooling passage 36 can be promoted.

As shown in FIG. 3, the inlet-side through hole 52 includes the upstream end opening 521 which opens on the outer surface of the protruding portion 50 and the downstream end opening 522 which opens toward the rotor core 28. Since the upstream end opening 521 is located outside the downstream end opening 522 in the radial direction of the rotor 14, the flow velocity of the introduced gas can be increased, and the inflow of the gas into the cooling passage 36 can be further promoted.

As shown in FIG. 5B, the second retaining member 42 is formed in a flat plate shape. The outlet-side through hole 60 includes the inclined inner surfaces 601 facing each other in the circumferential direction of the rotor 14 and inclined with respect to the axis AX. According to this configuration, it is possible to promote the discharge of the gas from the cooling passage 36 without increasing the thickness of the second retaining member 42 (without providing a protruding portion). Accordingly, the cooling efficiency can be improved while suppressing an increase in the weight of the second retaining member 42.

In FIG. 1, the sum of the flow path areas of the plurality of outlet-side through holes 60 is larger than the sum of the flow path areas of the plurality of inlet-side through holes 52. With this configuration, by relatively increasing the pressure on the gas inlet side in the cooling passage 36 and relatively decreasing the pressure on the gas outlet side, the pressure difference between the inlet side and the outlet side can be increased and the flow of the gas in the cooling passage 36 can be promoted.

The inlet-side through holes 52 are tubular passages and are provided at intervals in the circumferential direction of the rotor 14. The outlet-side through holes 60 each have an elongated hole shape in the radial direction of the rotor 14, and are radially provided at intervals in the circumferential direction. According to this configuration, since the exhaust efficiency from the cooling passage 36 is enhanced by the plurality of outlet-side through holes 60 each having an elongated hole shape, it is possible to further promote the inflow of gas in the inlet-side through holes 52 which are tubular passages.

The rotor core 28 includes the plurality of electromagnetic steel plates 32 laminated in the axial direction. The cooling passage 36 is formed in a spiral shape by connecting the hole portions 320 formed in the plurality of electromagnetic steel plates 32. According to this configuration, since the cooling passage 36 is formed in a spiral shape, the inflow of gas into the cooling passage 36 can be promoted when the rotor 14 rotates.

The above-described embodiments are summarized as follows.

The above embodiment discloses the rotating electric machine 10 including the shaft (12), the rotor (14) fixed to the shaft, the stator (16) surrounding the rotor, and the casing (20) accommodating the rotor and the stator, the rotating electric machine being configured to cool the part to be cooled by the gas flowing in the casing, wherein the rotor includes the rotor core (28) supported by the shaft, the rotor core includes the cooling passage (36) configured to allow communication between the first end surface (281) which is one end surface of the rotor core in the axial direction of the rotor core to the second end surface (282) which is the other end surface of the rotor core, the gas flowing through the cooling passage, the cooling passage includes the upstream end that opens in the first end surface and the downstream end that opens in the second end surface, the rotating electric machine further includes the rectifying structure (90) configured to convert the flow direction of the gas between the axial direction and the circumferential direction of the rotor, and the rectifying structure is fixed to the non-rotating portion (16) in the casing so as to face the rotor in the axial direction.

The rectifying structure may include the inlet-side rectifying member (91) facing the upstream end of the cooling passage, and the inlet-side rectifying member includes the plurality of inlet-side fins (912) configured to convert the flow direction from the axial direction into the circumferential direction.

The rectifying structure may include the outlet-side rectifying member (92) facing the downstream end of the cooling passage, and the outlet-side rectifying member may include the plurality of outlet-side fins (922) configured to convert the flow direction from the circumferential direction into the axial direction.

The rectifying structure may include the inlet-side rectifying member facing the upstream end of the cooling passage and the outlet-side rectifying member facing the downstream end of the cooling passage, the inlet-side rectifying member may include the plurality of inlet-side fins configured to convert the flow direction from the axial direction into the circumferential direction, and the outlet-side rectifying member includes the plurality of outlet-side fins configured to convert the flow direction from the circumferential direction into the axial direction.

The non-rotating portion may be the stator, and the rectifying structure may be fixed to the inner circumferential surface of the stator.

The stator may include the stator core (62), the coil end portion projecting from the stator core in the axial direction, and the mold portion having the annular shape and covering the coil end portion, and the rectifying structure may be fitted to the inner circumferential surface of the mold portion.

The shaft may be rotatably supported by the first bearing (24) disposed on one end side of the casing and the second bearing (26) disposed on the other end side of the casing, the first end surface of the rotor core may be disposed between the first bearing and the second end surface, and the second end surface of the rotor core may be disposed between the second bearing and the first end surface, and the inlet-side rectifying member may be disposed between the first bearing and the first end surface.

The shaft may be rotatably supported by the first bearing disposed on one end side of the casing and the second bearing disposed on the other end side of the casing, the first end surface of the rotor core may be disposed between the first bearing and the second end surface, the second end surface of the rotor core may be disposed between the second bearing and the first end surface, and the outlet-side rectifying member may be disposed between the second bearing and the second end surface.

The rotor may include the retaining member disposed on the first end surface of the rotor core, and the retaining member may include the inlet-side through hole (52) communicating with the cooling passage, and the inlet-side through hole may be inclined with respect to the axis of the rotor, and the length of each of the plurality of inlet-side fins in the radial direction may be set in a manner so that the plurality of inlet-side fins face the inlet-side through hole in the axial direction.

The rotor may include the retaining member disposed on the second end surface of the rotor core, the retaining member may include the outlet-side through hole (60) communicating with the cooling passage, and the outlet-side through hole may be inclined with respect to the axis of the rotor, and the length of each of the plurality of outlet-side fins in the radial direction may be set in a manner so that the plurality of outlet-side fins face the outlet-side through hole in the axial direction.

The rotor may include the first retaining member (41) disposed on the first end surface of the rotor core and the second retaining member (42) disposed on the second end surface of the rotor core, the first retaining member may include the inlet-side through hole communicating with the cooling passage, and the inlet-side through hole may be inclined with respect to an axis of the rotor, the second retaining member may include the outlet-side through hole communicating with the cooling passage, and the outlet-side through hole may be inclined with respect to the axis of the rotor, the length of each of the plurality of inlet-side fins in the radial direction may be set in a manner so that the plurality of inlet-side fins face the inlet-side through hole in the axial direction, the length of each of the plurality of outlet-side fins in the radial direction may be set in a manner so that the plurality of outlet-side fins face the outlet-side through hole in the axial direction, the shortest distance in the radial direction between the inlet-side through hole and the central axis of the shaft, and the shortest distance in the radial direction between the outlet-side through hole and the central axis may be different, and the length of each of the plurality of inlet-side fins in the radial direction and the length of each of the plurality of outlet-side fins in the radial direction may be different.

The present invention is not limited to the above disclosure, and various modifications are possible without departing from the essence and gist of the present invention.

The invention claimed is:

1. A rotating electric machine comprising: a shaft; a rotor fixed to the shaft; a stator surrounding the rotor; and a casing accommodating the rotor and the stator, the rotating electric machine being configured to cool a part to be cooled, by a gas flowing in the casing,
wherein the rotor includes a rotor core supported by the shaft,
the rotor core includes a cooling passage configured to allow communication between a first end surface which is one end surface of the rotor core in an axial direction of the rotor core to a second end surface which is another end surface of the rotor core, the gas flowing through the cooling passage,
the cooling passage includes an upstream end that opens in the first end surface and a downstream end that opens in the second end surface,
the rotating electric machine further comprises a rectifying structure configured to convert a flow direction of the gas between the axial direction and a circumferential direction of the rotor, and
the rectifying structure is fixed to a non-rotating portion in the casing so as to face the rotor in the axial direction.

2. The rotating electric machine according to claim 1, wherein the rectifying structure includes an inlet-side rectifying member facing the upstream end of the cooling passage, and
the inlet-side rectifying member includes a plurality of inlet-side fins configured to convert the flow direction from the axial direction into the circumferential direction.

3. The rotating electric machine according to claim 2, wherein the shaft is rotatably supported by a first bearing disposed on one end side of the casing and a second bearing disposed on another end side of the casing,
the first end surface of the rotor core is disposed between the first bearing and the second end surface,
the second end surface of the rotor core is disposed between the second bearing and the first end surface, and
the inlet-side rectifying member is disposed between the first bearing and the first end surface.

4. The rotating electric machine according to claim 2, wherein the rotor includes a retaining member disposed on the first end surface of the rotor core,
the retaining member includes an inlet-side through hole communicating with the cooling passage, and the inlet-side through hole is inclined with respect to an axis of the rotor, and
a length of each of the plurality of inlet-side fins in a radial direction is set in a manner so that the plurality of inlet-side fins face the inlet-side through hole in the axial direction.

5. The rotating electric machine according to claim 1, wherein the rectifying structure includes an outlet-side rectifying member facing the downstream end of the cooling passage, and the outlet-side rectifying member includes a plurality of outlet-side fins configured to convert the flow direction from the circumferential direction into the axial direction.

6. The rotating electric machine according to claim 5, wherein the shaft is rotatably supported by a first bearing disposed on one end side of the casing and a second bearing disposed on another end side of the casing,
the first end surface of the rotor core is disposed between the first bearing and the second end surface,
the second end surface of the rotor core is disposed between the second bearing and the first end surface, and
the outlet-side rectifying member is disposed between the second bearing and the second end surface.

7. The rotating electric machine according to claim 5, wherein the rotor includes a retaining member disposed on the second end surface of the rotor core,
the retaining member includes an outlet-side through hole communicating with the cooling passage, and the outlet-side through hole is inclined with respect to an axis of the rotor, and
a length of each of the plurality of outlet-side fins in a radial direction is set in a manner so that the plurality of outlet-side fins face the outlet-side through hole in the axial direction.

8. The rotating electric machine according to claim 1, wherein the rectifying structure includes an inlet-side rectifying member facing the upstream end of the cooling passage and an outlet-side rectifying member facing the downstream end of the cooling passage,
the inlet-side rectifying member includes a plurality of inlet-side fins configured to convert the flow direction from the axial direction into the circumferential direction, and
the outlet-side rectifying member includes a plurality of outlet-side fins configured to convert the flow direction from the circumferential direction into the axial direction.

9. The rotating electric machine according to claim 8, wherein the rotor includes a first retaining member disposed on the first end surface of the rotor core, and a second retaining member disposed on the second end surface of the rotor core,
the first retaining member includes an inlet-side through hole communicating with the cooling passage, and the inlet-side through hole is inclined with respect to an axis of the rotor,
the second retaining member includes an outlet-side through hole communicating with the cooling passage, and the outlet-side through hole is inclined with respect to the axis of the rotor,
a length of each of the plurality of inlet-side fins in a radial direction is set in a manner so that the plurality of inlet-side fins face the inlet-side through hole in the axial direction,
a length of each of the plurality of outlet-side fins in the radial direction is set in a manner so that the plurality of outlet-side fins face the outlet-side through hole in the axial direction,
a shortest distance in the radial direction between the inlet-side through hole and a central axis of the shaft, and a shortest distance in the radial direction between the outlet-side through hole and the central axis are different, and a length of each of the plurality of inlet-side fins in the radial direction and a length of each of the plurality of outlet-side fins in the radial direction are different.

10. The rotating electric machine according to claim 1, wherein the non-rotating portion is the stator, and
    the rectifying structure is fixed to an inner circumferential surface of the stator.

11. The rotating electric machine according to claim 10, wherein the stator includes a stator core, a coil end portion projecting from the stator core in the axial direction, and a mold portion having an annular shape and covering the coil end portion, and
    the rectifying structure is fitted to an inner circumferential surface of the mold portion.

* * * * *